United States Patent
Fukuya et al.

(10) Patent No.: US 9,924,087 B2
(45) Date of Patent: Mar. 20, 2018

(54) INFORMATION TERMINAL APPARATUS, INFORMATION ACQUISITION APPARATUS, INFORMATION SUPPORT METHOD, AND RECORDING MEDIUM RECORDING INFORMATION SUPPORT PROGRAM

(71) Applicant: Olympus Corporation, Shibuya-ku, Tokyo (JP)

(72) Inventors: Yoshiyuki Fukuya, Sagamihara (JP); Kazuhiko Shimura, Hachioji (JP); Kazuo Kanda, Higashiyamato (JP); Takeshi Kindaichi, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 100 days.

(21) Appl. No.: 15/043,825

(22) Filed: Feb. 15, 2016

(65) Prior Publication Data
US 2016/0248965 A1 Aug. 25, 2016

(30) Foreign Application Priority Data
Feb. 24, 2015 (JP) ................ 2015-034488

(51) Int. Cl.
*H04N 5/232* (2006.01)
*H04N 21/4363* (2011.01)
*H04N 1/00* (2006.01)

(52) U.S. Cl.
CPC ..... *H04N 5/23206* (2013.01); *H04N 5/23203* (2013.01); *H04N 5/23293* (2013.01);
(Continued)

(58) Field of Classification Search
CPC ........... H04N 5/23203; H04N 5/23293; H04N 5/23245; H04N 5/23209; H04N 5/23216; H04N 5/2254; H04N 5/23206; H04N 21/43637; H04N 1/00127; H04N 1/00307; G03B 17/02
See application file for complete search history.

(56) References Cited

U.S. PATENT DOCUMENTS 9,357,104 B2 * 5/2016 Toyoda .............. H04N 21/4307
9,357,126 B2 * 5/2016 Ishii ................... H04N 5/23245
(Continued)

FOREIGN PATENT DOCUMENTS

JP 2013-115828 6/2013

*Primary Examiner* — Michael Osinski
(74) *Attorney, Agent, or Firm* — John C. Pokotylo; Pokotylo Patent Services

(57) ABSTRACT

An information terminal apparatus includes: a first image pickup section that obtains a first picked-up image; a first communication section that receives a second picked-up image obtained by a second image pickup section according to a first communication standard; a second communication section that performs communication according to a second communication standard different from the first communication standard; and a display control section that displays the first picked-up image during the communication of the second communication section when communication of the first communication section is not established. Cooperative display control with respect to a plurality of picked-up images from a plurality of image pickup sections reduces a waiting time period before the picked-up images are displayed.

21 Claims, 6 Drawing Sheets

(52) U.S. Cl.
CPC ... *H04N 21/43637* (2013.01); *H04N 1/00307* (2013.01); *H04N 2201/0027* (2013.01)

(56) References Cited

U.S. PATENT DOCUMENTS

| | | | | |
|---|---|---|---|---|
| 9,374,523 | B2* | 6/2016 | Yoshida | H04N 1/00307 |
| 9,414,001 | B2* | 8/2016 | Yanagidate | H04N 5/23206 |
| 9,418,630 | B2* | 8/2016 | Tsujimoto | H04N 7/18 |
| 9,438,784 | B2* | 9/2016 | Endo | H04N 5/23203 |
| 9,451,143 | B2* | 9/2016 | Shinozaki | H04N 1/2112 |
| 9,485,431 | B2* | 11/2016 | Ohshima | H04N 5/23293 |
| 9,568,806 | B2* | 2/2017 | Kim | H04N 5/2254 |
| 2007/0198286 | A1* | 8/2007 | Tomita | G06F 21/32 713/182 |
| 2007/0268371 | A1* | 11/2007 | Misawa | H04N 5/2252 348/207.99 |
| 2009/0109241 | A1* | 4/2009 | Tsujimoto | H04N 7/18 345/633 |
| 2013/0141640 | A1* | 6/2013 | Kim | H04N 5/2254 348/375 |
| 2013/0178245 | A1* | 7/2013 | Kulas | H04M 1/0254 455/556.1 |
| 2014/0028916 | A1* | 1/2014 | Toyoda | H04N 21/4307 348/547 |
| 2014/0132781 | A1* | 5/2014 | Adams | H04N 5/2254 348/207.1 |
| 2014/0347503 | A1* | 11/2014 | Endo | H04N 5/23216 348/207.11 |
| 2015/0015794 | A1* | 1/2015 | Matsunaga | H04N 5/63 348/730 |
| 2015/0113425 | A1* | 4/2015 | Noh | G06F 3/14 715/740 |
| 2015/0201131 | A1* | 7/2015 | Ohshima | H04N 5/23293 348/333.07 |
| 2015/0237249 | A1* | 8/2015 | Sato | H04N 5/23203 348/207.11 |
| 2015/0237250 | A1* | 8/2015 | Shinozaki | H04N 5/23203 348/211.1 |
| 2015/0381887 | A1* | 12/2015 | Sato | H04N 5/23209 348/207.11 |
| 2016/0269514 | A1* | 9/2016 | Ito | H04M 1/0256 |
| 2016/0277646 | A1* | 9/2016 | Carr | H04N 5/23296 |
| 2016/0277674 | A1* | 9/2016 | Yamada | H04N 5/23225 |
| 2016/0295619 | A1* | 10/2016 | Koroku | H04W 12/00 |
| 2017/0187954 | A1* | 6/2017 | Fukuya | H04N 5/23232 |
| 2017/0200356 | A1* | 7/2017 | Kim | G08B 13/19656 |
| 2017/0300283 | A1* | 10/2017 | Deyle | G06F 3/1454 |

* cited by examiner

INFORMATION TERMINAL APPARATUS, INFORMATION ACQUISITION APPARATUS, INFORMATION SUPPORT METHOD, AND RECORDING MEDIUM RECORDING INFORMATION SUPPORT PROGRAM

CROSS REFERENCE TO RELATED APPLICATION

This application claims benefit of Japanese Application No. 2015-034488 in Japan on Feb. 24, 2015, the contents of which are incorporated by this reference.

BACKGROUND OF THE INVENTION

1. Field of the Invention

The present invention relates to so-called IoT (Internet of Things) in which a plurality of devices cooperate to realize a desired device and to an information terminal apparatus, an information acquisition apparatus, an information support method, and a recording medium recording an information support program for executing necessary information processing.

2. Description of the Related Art

In recent years, a portable information terminal, such as a smartphone, a tablet PC, and a notebook PC, and other devices cooperate with each other, and a technique of centralization of remote operation and information management as well as device control beyond various past restrictions has been explored.

While the number of devices that can communicate is increasing, sensors, cameras, and the like included in a portable information terminal have also evolved with an operation section and a display section. Optimization of a device used in an environment of the IoT is an important issue.

In such an environment, a smartphone, a tablet PC, and the like also function as control devices and act like remote controls for operating other devices wirelessly or through wires. A touch panel or the like provided on a display section can be utilized to remotely operate other devices or to collect information from other devices. Therefore, quick connection and start of function are important factors of the technique.

For example, Japanese Patent Application Laid-Open Publication No. 2013-115828 discloses a technique of exchanging device information for communication connection through contact with a specific device to control a short-range communication module that communicates with the specific device based on the exchanged device information. The technique can be utilized to also control a lens-type camera by a smartphone or the like.

In recent years, portable devices with photographing functions (photographing apparatuses), such as digital cameras, have been widely used. Some of the photographing apparatuses of this type include display sections and have functions for displaying photographed images. In some of the photographing apparatuses, menu screens are displayed on display sections to facilitate operation of the photographing apparatuses. The display sections are often provided on back sides of portable device bodies, and at photographing, users can perform photographing operation while checking through images displayed on the display sections on the back sides.

In recent years, a lens-type camera not including a display section of a picked-up image and having only photographing and recording functions has been adopted in some cases. The lens-type camera of this type is generally attached to a smartphone, a tablet PC, or the like, and the smartphone, the tablet PC, or the like mounted with the lens-type camera serves as a control device to control photographing. The control device, such as the smartphone and the tablet PC, also functions as an image pickup display apparatus that displays a picked-up image from the lens-type camera.

The control device, such as the smartphone and the tablet PC, is connected to the lens-type camera through wireless or wired communication, and a touch panel or the like provided on a display section can be utilized to perform photographing operation of the lens-type camera.

By the way, a communication module corresponding to a short-range wireless standard, such as Bluetooth (registered trademark), can be utilized to control a cooperative device, such as a lens-type camera, by a smartphone or the like. However, when a communication capacity is large such as in image transfer, a communication module corresponding to a standard with a relatively high transfer rate, such as WiFi (Wireless Fidelity), is often adopted. In addition, a plurality of communications with different communication capacities, such as infrared communication and LTE, are adopted.

SUMMARY OF THE INVENTION

The present invention provides an information terminal apparatus including: a first image pickup section that obtains a first picked-up image; a first communication section that receives a second picked-up image obtained by a second image pickup section according to a first communication standard; a second communication section that performs communication according to a second communication standard different from the first communication standard; and a display control section that displays the first picked-up image during the communication of the second communication section when communication of the first communication section is not established.

The present invention provides an information terminal apparatus including: a third communication section that performs communication according to a first communication standard with a device including a first image pickup section that obtains a first picked-up image; a fourth communication section that performs communication according to a second communication standard different from the first communication standard; a second image pickup section that obtains a second picked-up image; and a control section that transmits the second picked-up image obtained by the second image pickup section to the device through the third communication section and transmits photographing information related to the second image pickup section to the device through the fourth communication section when the communication of the third communication section is not established.

The present invention provides an information support method including: a step of executing processing for establishing communication according to a first communication standard used for image transfer; a step of executing processing for establishing communication according to a second communication standard different from the first communication standard; a step of acquiring a first picked-up image by a first image pickup section; a step of displaying the first picked-up image; a step of acquiring photographing information related to photographing of a second image pickup section through the communication based on the second communication standard once the communication according to the second communication standard is established when the communication according to the first communication standard is not established; a step of displaying a display based on the photographing information on top of the first picked-up image; and a step of displaying a second picked-up image obtained by the second image pickup section once the communication according to the first communication standard is established.

The present invention provides a computer-readable recording medium recording an information support program for causing a computer to execute: a step of executing processing for establishing communication according to a first communication standard used for image transfer; a step of executing processing for establishing communication according to a second communication standard different from the first communication standard; a step of acquiring a first picked-up image by a first image pickup section; a step of displaying the first picked-up image; a step of acquiring photographing information related to photographing of a second image pickup section through the communication based on the second communication standard once the communication according to the second communication standard is established when the communication according to the first communication standard is not established; a step of displaying a display based on the photographing information on top of the first picked-up image; and a step of displaying a second picked-up image obtained by the second image pickup section once the communication according to the first communication standard is established.

The present invention provides an information acquisition apparatus including: a first information acquisition section that obtains first information; a first communication section that receives second information obtained by a second information acquisition section according to a first communication standard; a second communication section that performs communication according to a second communication standard different from the first communication standard; and a display control section that notifies a user of the first information during the communication of the second communication section when communication of the first communication section is not established.

The above and other objects, features and advantages of the invention will become more clearly understood from the following description referring to the accompanying drawings.

DETAILED DESCRIPTION OF THE PREFERRED EMBODIMENTS

Hereinafter, embodiments of the present invention will be described in detail with reference to the drawings.

First Embodiment

Figure 1:
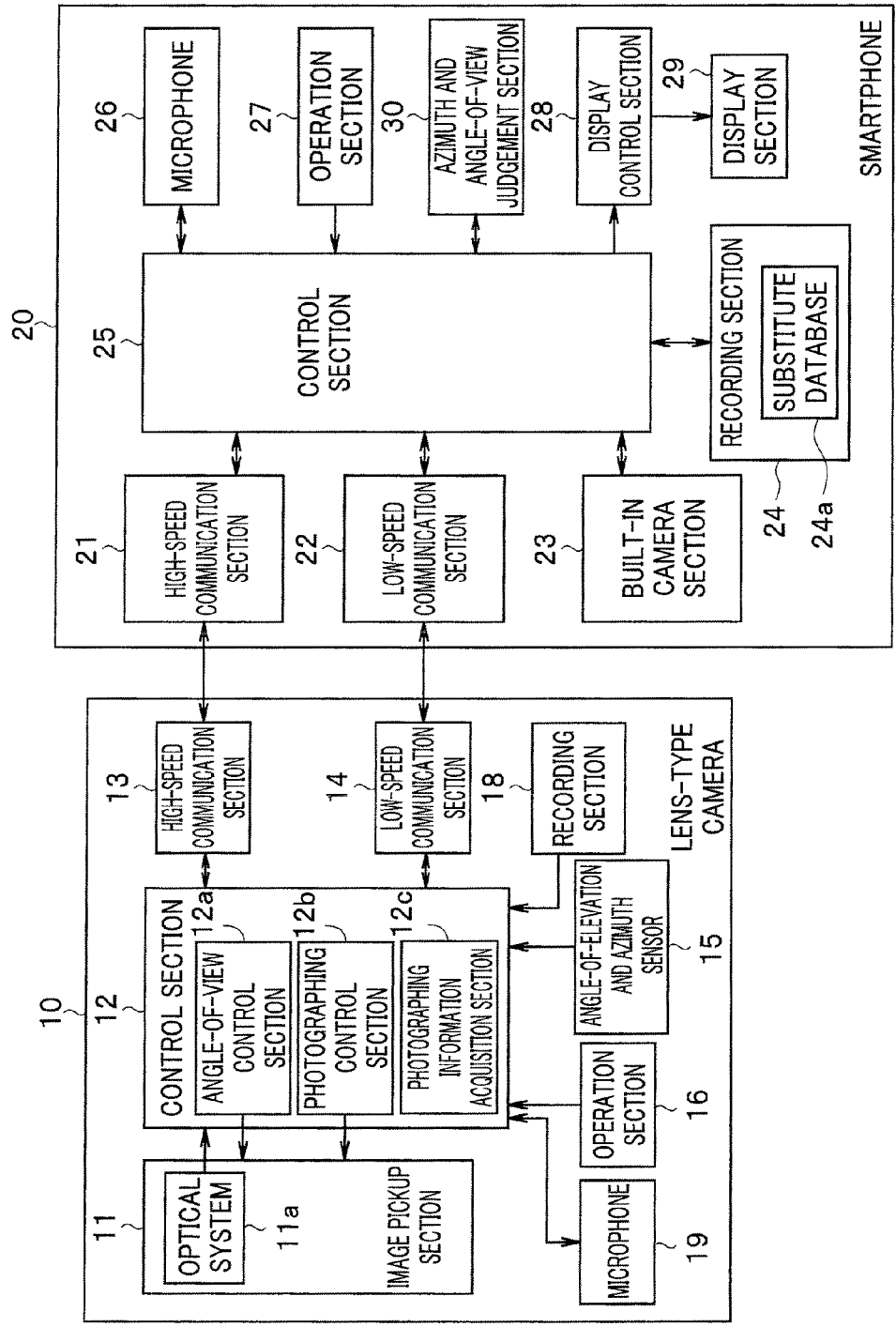
FIG. 1 is a block diagram showing an information terminal apparatus according to a first embodiment of the present invention.
Figure 2:
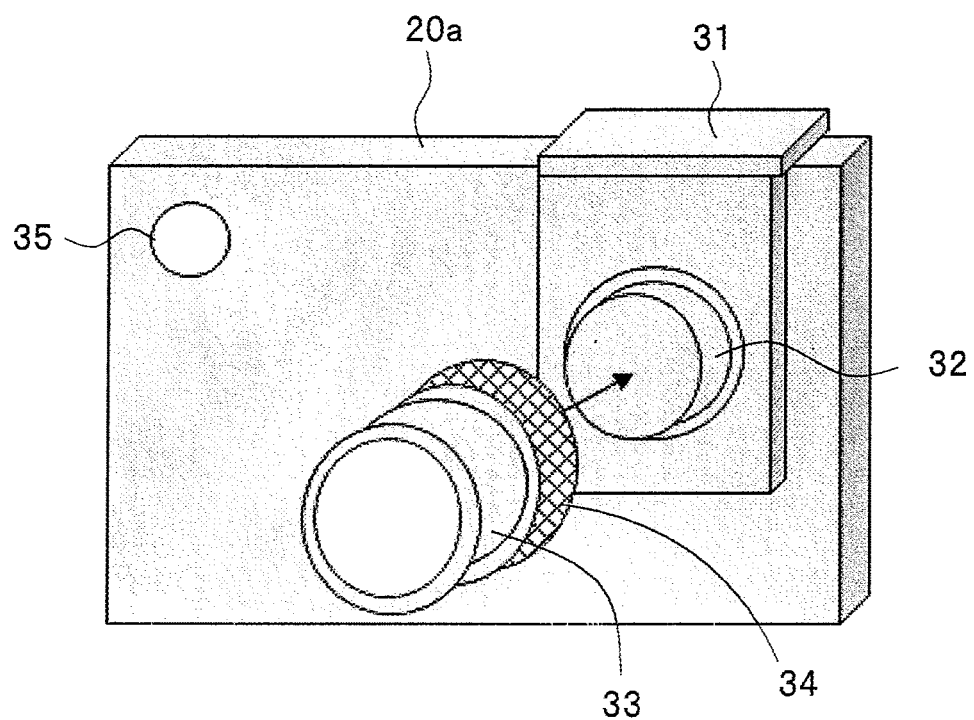
FIG. 2 is an explanatory diagram showing an appearance when the present embodiment is realized by a smartphone including a built-in camera and by a lens-type camera.

FIG. 1 is a block diagram showing an information terminal apparatus according to a first embodiment of the present invention. FIG. 2 is an explanatory diagram showing an appearance when the present embodiment is realized by a smartphone including a built-in camera and by a lens-type camera. Note that a tablet PC or a portable phone may be adopted in place of the smartphone. Other than the lens-type camera, various photographing devices including image pickup sections may be adopted.

In general, the smartphone is always used in an active state even when a display screen is turned off. Therefore, the display screen of the smartphone can be turned on in a relatively short time period from a start of operation to display an image taken by the built-in camera. Accordingly, short-range wireless communication, such as Bluetooth (registered trademark), that can establish communication in a relatively short time period is utilized in the present embodiment to use the smartphone and the lens-type camera in cooperation with each other, and image pickup and display by the built-in camera of the smartphone are effectively utilized to enable high-speed photographing without missing a photo opportunity. Note that although wireless LAN communication according to a first communication standard, such as WiFi, is generally communication with a relatively high transfer rate (hereinafter, also called high-speed communication), a relatively large amount of power is required. Therefore, the communication needs to be established and controlled from the beginning when the communication needs to be used, and there is also a problem that complicated communication procedures, such as terminal search and key exchange of security, are determined by the standard. Therefore, a relatively long time period is required to establish the communication. On the other hand, although short-range wireless communication according to a second communication standard is communication with a relatively low transfer rate (hereinafter, also called low-speed communication), there is an advantage that the amount of power is small. Full-time connection and intermittent connection can be performed, and the time period required to establish the communication can be short. Particularly, a type with power consumption reduced by further lowering a forward rate to limit content of the communication is also proposed. Stable communication, such as frequency hopping, is also possible. Recently, a communication standard of a type has been made that can almost always wait for communication by particularly reducing the power consumption. Considering that such a device is made by reducing the amount of data communication, the low-speed communication can also be simply stated that the connection is fast. In the description of the present embodiment, high-speed communication is mainly adopted for image transfer (or high-quality sound). That is, frustration of a user is reduced in the present embodiment by offering substitute means by adopting other means when high-speed communication cannot be quickly performed so that satisfactory data cannot be quickly acquired. Examples of the substitute means include combining things that can be performed in the low-speed communication to compensate insufficient parts and making a replacement by an internal function not requiring communication. To do so, a device is also necessary to determine in advance what kind of internal function can assist a function utilized by an external device.

As shown in FIG. 2, an attachment instrument 31 is detachably attached to a housing 20a of a smartphone 20 (FIG. 1), and an attachment portion 32 for attaching a lens-type camera 10 (FIG. 1) is provided on the attachment instrument 31. The lens-type camera 10 includes a barrel 33 housing an image pickup section 11, and an attachment portion 34 is provided on a proximal end side of the barrel 33. The attachment portion 34 can be attached to the attachment portion 32 of the attachment instrument 31 by insertion, screw-in, or the like.

In FIG. 1, a high-speed communication section 21 and a low-speed communication section 22 are provided on the smartphone 20. A high-speed communication section 13 and a low-speed communication section 14 are provided on the lens-type camera 10. The high-speed communication sections 13 and 21 are capable of high-speed communication by a wireless LAN, such as WiFi. The low-speed communication sections 14 and 22 are capable of low-speed communication by short-range wireless communication, such as Bluetooth (registered trademark).

The smartphone 20 and the lens-type camera 10 can communicate with each other through the high-speed communication sections 21 and 13 and can communicate with each other through the low-speed communication sections 14 and 22. A display section 29 is provided on the smartphone 20, and a display control section 28 can display a picked-up image from the lens-type camera 10 on a display screen 29a (see FIGS. 4A to 4C) of the display section 29.

The image pickup section 11 housing an optical system 11a in the barrel 33 is provided on the lens-type camera 10, and the optical system 11a includes a focus lens that can be moved to set a focus (focusing) state by focusing, a zoom lens that can change a magnification in the focus state, and the like (not shown) in the barrel 33. The optical system 11a also includes a mechanism section not shown that drives the lenses and a diaphragm.

An image pickup device not shown including a CCD, a CMOS sensor, or the like is provided on the image pickup section 11, and the optical system 11a guides an object optical image to an image pickup surface of the image pickup device. A control section 12 is configured to control a mechanism section of the optical system 11a to drive and control the focus lens, the zoom lens, and the diaphragm. The image pickup device photoelectrically converts the object optical image to obtain a picked-up image.

The control section 12 of the lens-type camera 10 includes a processor, such as a CPU. The control section 12 controls each section of the lens-type camera 10 based on a signal from the smartphone 20 described later. An operation section 16 is also provided on the lens-type camera 10, and the operation section 16 provides an operation signal based on user operation to the control section 12. The control section 12 can also control each section of the lens-type camera 10 based on an operation signal from the operation section 16.

A photographing control section 12b generates a focus signal, a zoom signal, and a diaphragm control signal to drive and control focusing, zooming, and the diaphragm of the optical system 11a. The photographing control section 12b also supplies a drive signal to the image pickup device to control image pickup of an object. A photographing angle of view is set based on user operation or by designation by the smartphone 20, and an angle-of-view control section 12a can control the image pickup section 11 to adjust the photographing angle of view.

The picked-up image from the image pickup section 11 is provided to the control section 12. The control section 12 can apply predetermined image signal processing, such as color adjustment processing, matrix conversion processing, noise removal processing, and various other signal processing to the picked-up image and provide the picked-up image to a recording section 18 to record the picked-up image. An example of the recording section 18 includes an IC memory. The control section 12 can also forward the picked-up image to the smartphone 20 through the high-speed communication section 13.

The control section 12 includes a photographing information acquisition section 12c. The photographing information acquisition section 12c acquires photographing information including at least one of lens information related to the lenses, such as a lens state of the zoom lens, the focus lens, and the like and a diaphragm state, information related to photographing, such as an angle of view, and other information. The photographing information acquisition section 12c can forward the acquired photographing information to the smartphone 20 through the low-speed communication section 14. The lens information also includes information of distance in an optical axis direction, such as a focus position and a range of a depth of field.

An angle-of-elevation and azimuth sensor 15 is also provided on the lens-type camera 10. The angle-of-elevation and azimuth sensor 15 is configured to detect a posture of the image pickup section 11 of the lens-type camera 10 and output a detection result to the control section 12. The control section 12 can judge a photographing direction of the image pickup section 11 based on the detection result of the angle-of-elevation and azimuth sensor 15. Note that the control section 12 is also configured to output photographing information including the information related to the photographing direction of the image pickup section 11 to a control section 25 of the smartphone 20.

The high-speed communication section 13 can communicate with the high-speed communication section 21 provided on the smartphone 20 through a predetermined transfer path. Examples of the transfer path include various wired and wireless transfer paths, such as a USB (Universal Serial Bus) cable and a transfer path of a wireless LAN of WiFi (Wireless Fidelity) or the like.

The low-speed communication section 14 can communicate with the low-speed communication section 22 provided on the smartphone 20 through a predetermined transfer path. An example of the transfer path includes a transfer path of short-range wireless communication, such as Bluetooth (registered trademark).

When the communication with the smartphone 20 is established through the low-speed communication sections 14 and 22, the control section 12 controls photographing according to the control section 25 of the smartphone 20 and can forward various information (photographing information) related to the photographing to the smartphone 20. When the communication with the smartphone 20 is established through the high-speed communication sections 13 and 21, the control section 12 can forward the picked-up image acquired by the image pickup section 11 to the smartphone 20.

The smartphone 20 includes the control section 25 including a processor, such as a CPU, and the control section 25 controls each section of the smartphone 20. The control section 25 is configured to transmit a drive control signal for driving the image pickup device to the control section 12 of the lens-type camera 10 through the low-speed communication sections 22 and 14 and to receive the photographing information transmitted from the control section 12. The control section 25 also receives the picked-up image from the lens-type camera 10 through the high-speed communication sections 13 and 21.

In the present embodiment, a built-in camera section 23 is provided on the smartphone 20. An image pickup device not shown including a CCD, a CMOS sensor, or the like is provided on the built-in camera section 23, and an object optical image entered through a lens 35 provided on the housing 20a enters an image pickup surface of the image pickup device. The built-in camera section 23 is controlled by the control section 25 to pick up an image of an object and can output the picked-up image to the control section 25. The control section 25 can perform various photographing control, such as focus control, exposure control, white balance control, and angle-of-view control, during the image pickup by the built-in camera section 23.

The control section 25 applies predetermined signal processing, such as color adjustment processing, matrix conversion processing, noise removal processing, and various other signal processing, to the picked-up image (hereinafter, also called external picked-up image) received through the high-speed communication section 21 and the picked-up image (hereinafter, also called built-in camera image) from the built-in camera section 23.

The control section 25 can execute processing related to recording and replay of the picked-up image. For example, the control section 25 can apply compression processing to the photographed image after the signal processing and provide the image after the compression to a recording section 24 to record the image. Examples of the recording section 24 include various recording media, such as an IC memory, and the recording section 24 can record image information, sound information, and the like in the recording medium. A device is also necessary to determine in advance what kind of internal device can assist a function utilized by an external device. Therefore, a substitute database 24a may be provided on the recording section 24 to indicate which internal device can be used for an external device. This may be written by application software or the like that controls the external device. Information sent in the low-speed communication may also be recorded in association with this.

The display control section 28 executes various processing related to display. The photographed image after the signal processing is provided from the control section 25, and the display control section 28 can provide and display the photographed image on the display section 29. The display section 29 includes the display screen 29a, such as an LCD, and displays the image provided from the display control section 28. The display control section 28 can also display various menu displays and the like on the display screen 29a of the display section 29. The control section 25 can read the picked-up image recorded in the recording section 24 to apply extension processing to the picked-up image. The display control section 28 can provide the picked-up image after the extension processing to the display section 29 to replay the recorded image.

An operation section 27 is also mounted on the smartphone 20. The operation section 27 includes various operation sections, such as a switch, a key, and a software keyboard not shown, provided on the smartphone 20 and is configured to generate an operation signal based on user operation to output the operation signal to the control section 25. The control section 25 controls each section based on the operation signal.

A touch panel not shown is provided on the display screen 29a of the display section 29. The touch panel can generate an operation signal according to a position on the display screen 29a indicated by a finger by the user. The operation signal is supplied to the control section 25. As a result, when the user touches or slides the display screen 29a, the control section 25 can detect various operations, such as touch position of user, operation of closing and separating fingers (pinching operation), slide operation, position reached after slide operation, slide direction, and period of touching, and the control section 25 can execute the processing corresponding to the user operation.

Note that the display screen 29a is mounted to occupy, for example, almost an entire area of a front surface of the housing 20a of the smartphone 20. The user can check the picked-up image displayed on the display screen 29a of the display section 29 at the photographing by the lens-type camera 10 and can perform the photographing operation while checking the picked-up image.

An azimuth and angle-of-view judgment section 30 can judge a direction of the smartphone 20 and a photographing angle of view of the built-in camera section 23 and output a judgment result to the control section 25. The control section 25 can figure out the photographing direction and the photographing range of the built-in camera section 23 based on the judgment result of the azimuth and angle-of-view judgment section 30.

In the present embodiment, the control section 25 can perform action in a cooperative mode for performing the photographing by the lens-type camera 10 and the photographing by the built-in camera section 23 in cooperation with each other. In the cooperative mode, the control section 25 controls the display control section 28 to display the picked-up image obtained by the built-in camera section 23 on the display section 29 until the communication of the high-speed communication sections 21 and 13 is established. The control section 25 is configured to acquire the photographing information from the control section 12 of the lens-type camera 10 through the communication sections 22 and 14 when the communication of the low-speed communication sections 22 and 14 is established in the cooperative mode. In the present embodiment, the control section 25 displays the display of the information related to the photographing by the lens-type camera 10 on the display section 29 based on the acquired photographing information.

The control section 25 can also judge a range (hereinafter, also called external picked-up image range) of an image part of the external picked-up image included in the built-in camera image. The photographing information acquired from the lens-type camera 10 includes the information of photographing direction, the zoom information, and the like of the image pickup section 11 of the lens-type camera 10. The control section 25 can use the judgment result of the azimuth and angle-of-view judgment section 30 and the photographing information from the lens-type camera 10 or can further use the information of the attachment position of the attachment instrument 31 on the housing 20a and the photographing condition of the built-in camera section 23 to obtain the external picked-up image range. The control section 25 can provide the information of the obtained external picked-up image range to the display control section 28 to display a frame image indicating the external picked-up image range in the built-in camera image.

Although the control section 25 can obtain features of the image from the received external picked-up image to compare the features to the built-in camera image to judge the external picked-up image range, the control section 25 can judge the external picked-up image range based on the photographing information or the like related to the angle of view and the photographing direction to obtain the external picked-up image range before the external picked-up image is transferred to the smartphone 20 in the present embodiment.

In this way, the control section 25 can also display, for example, the information display of the photographing conditions of the lens-type camera 10 on top of the picked-up image of the built-in camera section 23, as a display based on the photographing information. For example, the information display may be a display of a numeral of focal length of the lens-type camera 10 or may be a display of a frame image indicating a range of the angle of view of the lens-type camera 10, that is, the external picked-up image range. The control section 25 may also be able to change one of the photographing condition of the lens-type camera 10 and the photographing condition of the built-in camera section 23 based on the other photographing condition.

For example, when the communication sections 14 and 22 can communicate in a short time period just after the start, the photographing information related to the angle of view of the image and the photographing direction can be transmitted through the communication sections 14 and 22 in the cooperative mode. In a period in which the picked-up image from the image pickup section 11 of the lens-type camera 10 is not transferred to the smartphone 20 because the communication of the high-speed communication sections 13 and 21 is not established as in a period just after the start, the control section 25 can also display the built-in camera image on the display screen 29a. Furthermore, the frame image indicating the range of the external picked-up image of the lens-type camera 10 can also be displayed on the built-in camera image before the reception of the external picked-up image. As a result, the user can also check the photographing range of the lens-type camera 10 in advance.

Figure 3:
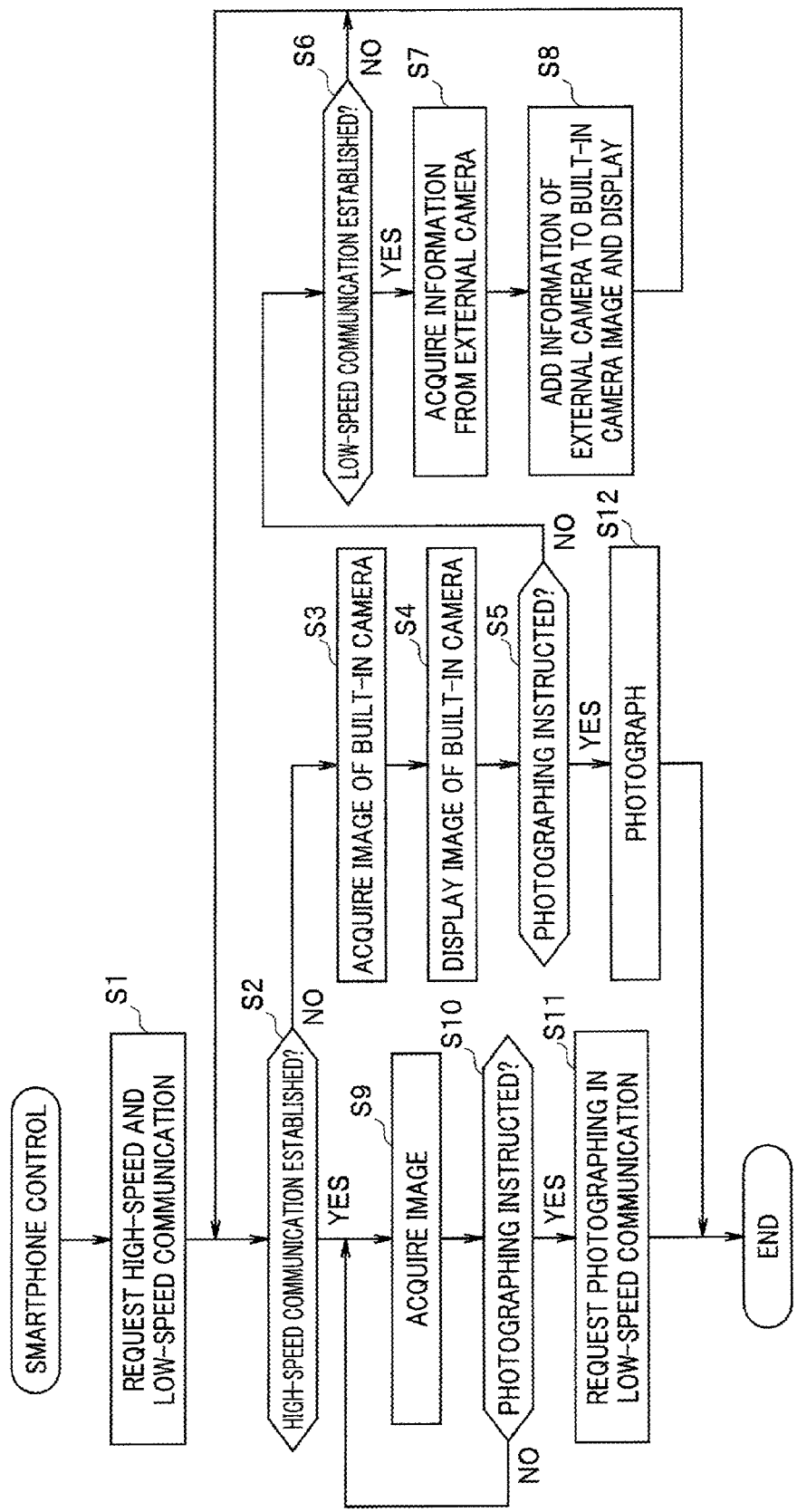
FIG. 3 is a flowchart showing control by a smartphone 20 of the first embodiment.
Figure 4A:
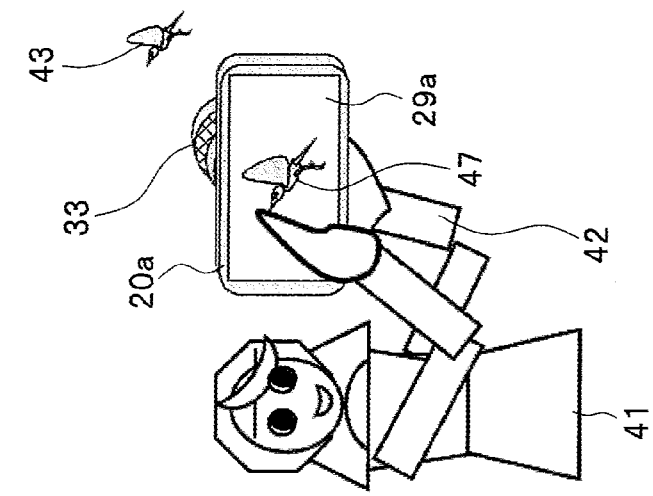
FIGS. 4A to 4C are explanatory diagrams showing situations of photographing.
Figure 4B:
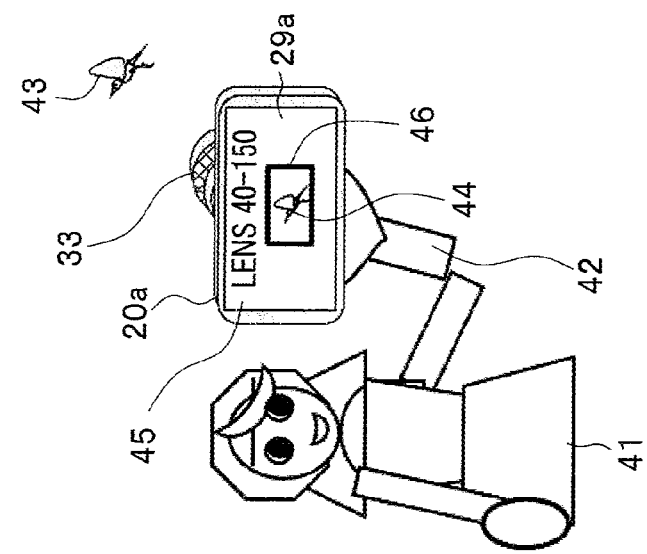
Figure 4C:
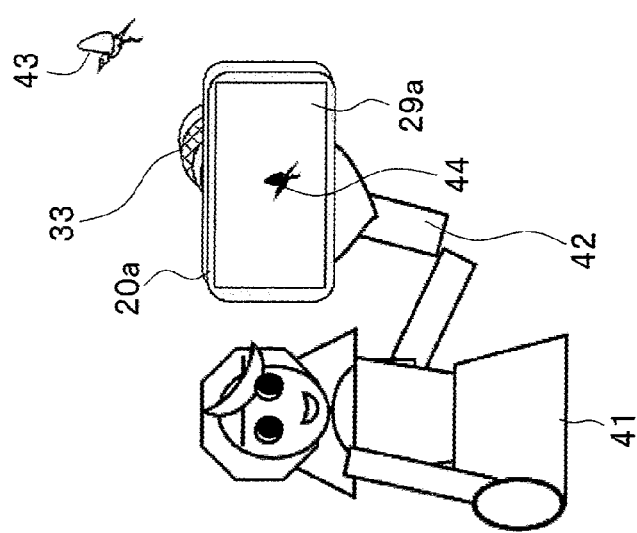

Next, action of the embodiment with the configuration will be described with reference to FIG. 3 and FIGS. 4A to 4C. FIG. 3 is a flowchart showing control by the smartphone 20 according to the first embodiment. FIGS. 4A to 4C are explanatory diagrams showing situations of photographing, indicating display on the display screen 29a of the display section 29.

A photographer mounts the lens-type camera 10 on the attachment instrument 31 attached to the smartphone 20. FIGS. 4A to 4C illustrate this state. For example, a photographer 41 can grasp the housing 20a of the smartphone 20 and the barrel 33 by a left hand 42 to perform photographing in a state that an object is within a range of view, while viewing a through image displayed on the display screen 29a of the display section 29 and capturing the object in the range of view. Although a representative example in exchanging information is described based on an image here, the information is not limited to the image, and any information that can be acquired can be applied, from the viewpoint of reducing the frustration of the user by offering substitute means by adopting other means when the communication cannot be performed. An example of the representative example of the information other than the image includes sound data. A direction of a microphone and the like are also important factors in sound information, and performance as in the photographing is required.

The control shown in FIG. 3 is performed in the cooperative mode of the smartphone 20. In step S1 of FIG. 3, the control section 25 requests the high-speed communication by the high-speed communication section 21 and the low-speed communication by the low-speed communication section 22. The high-speed communication section 21 and the low-speed communication section 22 execute processing for establishing communication with the high-speed communication section 13 of the lens-type camera 10 and the low-speed communication section 14 of the lens-type camera 10, respectively.

The control section 25 judges whether the high-speed communication by the high-speed communication sections 21 and 13 is established in step S2. Since a relatively long time period is required to establish the high-speed communication, the high-speed communication is not established when the time period from the request of the high-speed communication is relatively short, and the processing moves to step S3. If the high-speed communication is not established, the control section 25 acquires the built-in camera image from the built-in camera section 23 in step S3. The control section 25 provides the acquired built-in camera image to the display control section 28 to display the built-in camera image on the display screen 29a of the display section 29 (step S4). FIG. 4A shows this state, and the built-in camera image including an image 44 based on a bird 43 as an object is displayed on the display screen 29a of the display section 29. A microphone 26 may be included, and not only the image information of camera, but also sound information may be acquired to display related information such as sound volume. In this way, gain adjustment of sound volume level, equalizer, noise cancellation, and the like can be set in advance, and preparation and the like become convenient. As described, the function used when the high-speed communication cannot be performed may be searched in the substitute database 24a and designated, and such a device is obviously possible. It is obvious that the user may be able to arbitrarily rewrite and customize the data. For example, network information can be acquired before the camera is connected. The stress of the user can be reduced even in the setting not related to the image, and the frustration can be reduced. If the specification stipulates that a sample image is to be searched on the network, this is not necessarily unrelated to photographing.

Next, the control section 25 judges whether a photographing instruction is generated in step S5. If the photographing instruction is not generated, the control section 25 judges whether low-speed communication is established in step S6. If the low-speed communication is not established, the control section 25 returns the processing to step S2 to repeat similar processing.

The low-speed communication is established in a relatively short time period from the request of the low-speed communication. When the low-speed communication is established, the control section 25 moves the processing to step S7 and acquires the photographing information, the photographing direction information, the posture information, and the like (some of the information may not be included) from the lens-type camera 10 that is an external camera. The photographing information acquisition section 12c of the lens-type camera 10 outputs the acquired photographing information to the control section 25 through the low-speed communication sections 22 and 14. The control section 25 controls the display control section 28 to display the display based on the acquired photographing information on the built-in camera image (step S8). In this way, an information display 45 based on the photographing information of the lens-type camera 10 is displayed on the display screen 29a of the display section 29. Note that the content of the communication in step S8 may be sound information or the like with a relatively small amount of information.

FIG. 4B shows this state, and the information display 45 of the focal length of the lens-type camera 10 is displayed on the built-in camera image including the image 44, on the display screen 29a of the display section 29. Based on the information display 45, the user can recognize the information related to the image pickup by the lens-type camera 10 before the establishment of the high-speed communication and the display of the picked-up image from the lens-type camera 10 on the display screen 29a of the smartphone 20, and the user can predict the picked-up image of the lens-type camera 10 on some level. Note that the communication with the lens-type camera 10 is in the middle of the establishment, and for example, a message "establishing communication" indicating that the picked-up image from the lens-type camera 10 is not yet displayed on the display screen 29a may be displayed on top of the built-in camera image.

A frame image 46 indicating the external picked-up image range based on the judgment result of the azimuth and angle-of-view judgment section 30 and the photographing information of the lens-type camera 10 is also displayed on the display screen 29a. The control section 25 judges a range in the built-in camera image corresponding to the external picked-up image based on the photographing information transmitted from the lens-type camera 10 through the low-speed communication and the information of the photographing direction, the range of the angle of view, and the like of the lens-type camera 10. The control section 25 controls the display control section 28 to display the frame image 46 indicating the external picked-up image range that is a judgment result on the display screen 29a.

The display of the frame image 46 allows the user to recognize the photographing range of the picked-up image of the lens-type camera 10 before the establishment of the high-speed communication and the display of the picked-up image from the lens-type camera 10 on the display screen 29a of the smartphone 20.

If the control section 25 judges that the operation for instructing photographing is performed by the user in step S5, the control section 25 executes photographing processing in step S12. For example, when the photographing operation by the user is photographing operation for the built-in camera section 23, the control section 25 applies predetermined still image processing to the picked-up image from the built-in camera section 23 and provides and records the processed still image in the recording section 24.

That is, in this case, photographing can be performed while checking the through image based on the picked-up image of the built-in camera section 23 before the establishment of the high-speed communication and the display of the picked-up image from the lens-type camera 10 on the display screen 29a of the smartphone 20, and for example, photographing can be performed without missing the photo opportunity at the start of the lens-type camera 10.

When the photographing operation by the user is photographing operation for the lens-type camera 10, the control section 25 instructs photographing by the lens-type camera 10 through the low-speed communication section 22 in step S12. When the control section 12 of the lens-type camera 10 receives the information of the photographing instruction through the low-speed communication section 14, the control section 12 controls the image pickup section 11 to pick up an image. The control section 12 applies predetermined still image processing to the picked-up image from the image pickup section and provides and records the processed picked-up image in the recording section 18.

That is, in this case, the user can estimate the picked-up image of the lens-type camera 10 through the through image based on the picked-up image of the built-in camera section 23 before the establishment of the high-speed communication and the display of the picked-up image from the lens-type camera 10 on the display screen 29a of the smartphone 20, and photographing by the lens-type camera 10 is possible on some level with a composition or the like desired by the user. As a result, the lens-type camera 10 can obtain the picked-up image desired by the user in a relatively short time period from the request of the high-speed communication even before the establishment of the high-speed communication.

After a predetermined time period from the request of the high-speed communication, the high-speed communication is established between the high-speed communication sections 13 and 21. If the control section 25 judges that the high-speed communication is established in step S2, the control section 25 moves the processing to step S9 to acquire the picked-up image and the sound information from the lens-type camera 10. The control section 12 of the lens-type camera 10 transfers the picked-up image from the image pickup section 11 to the smartphone 20 through the high-speed communication sections 13 and 21. The control section 25 provides the picked-up image received through the high-speed communication section 21 to the display control section 28 and displays the through image on the display screen 29a of the display section 29. Although an image with a large amount of information is described here, the communication may be preferable when the quality of the sound is improved by increasing the resolution, and the number of channels is increased.

FIG. 4C shows a screen display in this case, and the external picked-up image including an image 47 of the bird 43 as an object is displayed on the display screen 29a of the display section 29. The control section 25 judges whether operation of instructing photographing is performed by the user in step S10. When the photographing operation is performed by the user, the control section 25 instructs the lens-type camera 10 to perform photographing through the low-speed communication section 22 in step S11. When the control section 12 of the lens-type camera 10 receives the information of the photographing instruction through the low-speed communication section 14, the control section 12 controls the image pickup section 11 to pick up an image. The control section 12 applies predetermined still image processing to the picked-up image from the image pickup section. The control section 12 can provide and record the processed picked-up image in the recording section 18 or can provide the processed picked-up image to the smartphone 20 through the high-speed communication sections 13 and 21 to record the processed picked-up image in the recording section 24 of the smartphone 20.

In this way, the picked-up image from the lens-type camera that is an external camera is received based on the high-speed communication in the present embodiment. The information terminal apparatus that receives the photographing information from the lens-type camera based on the low-speed communication displays the picked-up image of the built-in camera on the display section before the establishment of the high-speed communication and displays the information display based on the photographing information from the lens-type camera on top of the picked-up image. As a result, the picked-up image of the lens-type camera can be predicted before the display of the picked-up image by the lens-type camera, and photographing desired by the user can be performed on some level, compared to when photographing is performed without checking the through image at all. As a result, the desired photographing can be performed on some level without missing the photo opportunity even before the establishment of the high-speed communication.

Second Embodiment

Figure 5:
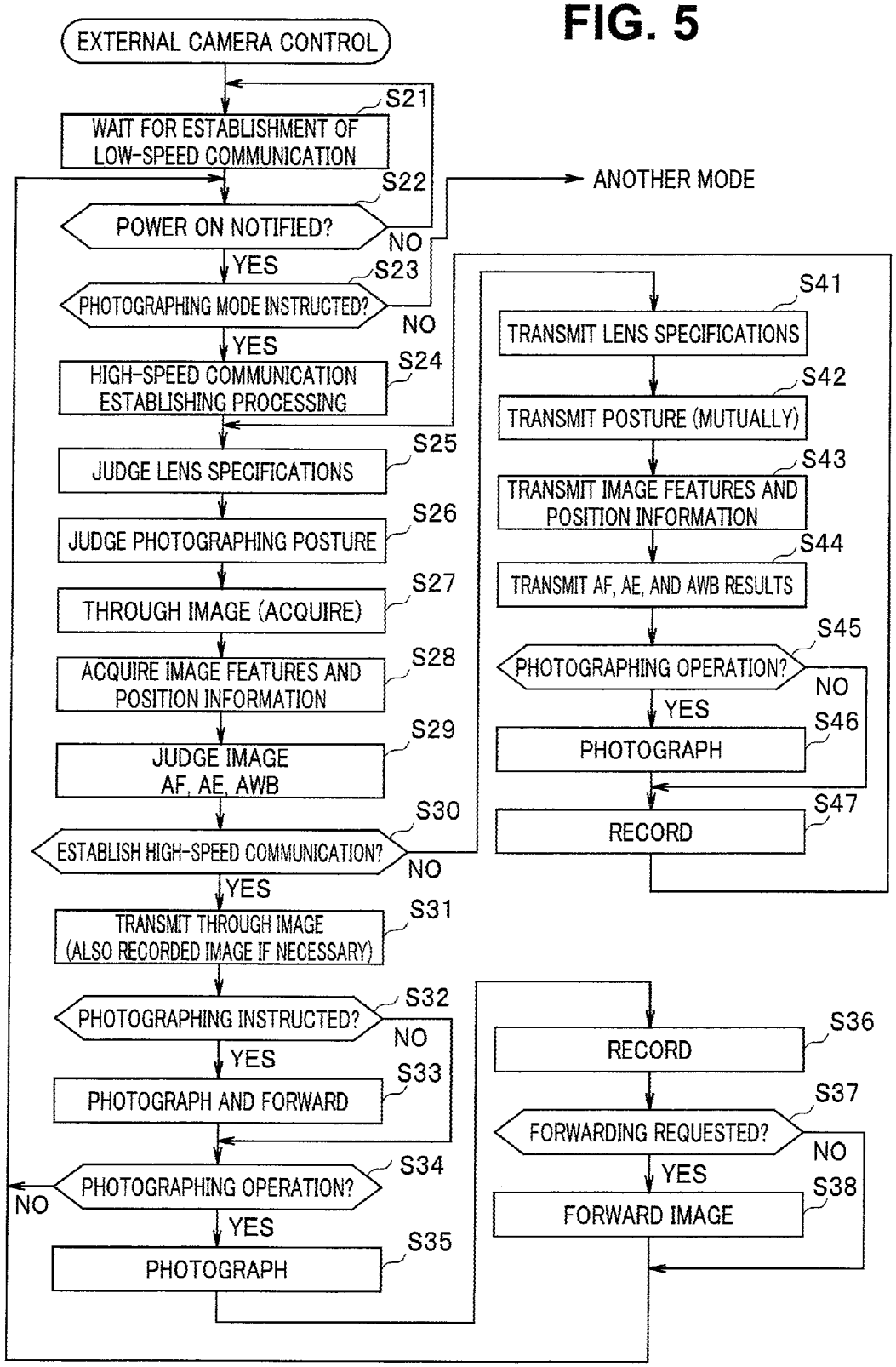
FIG. 5 is a flowchart showing camera control adopted in a second embodiment.
Figure 6:
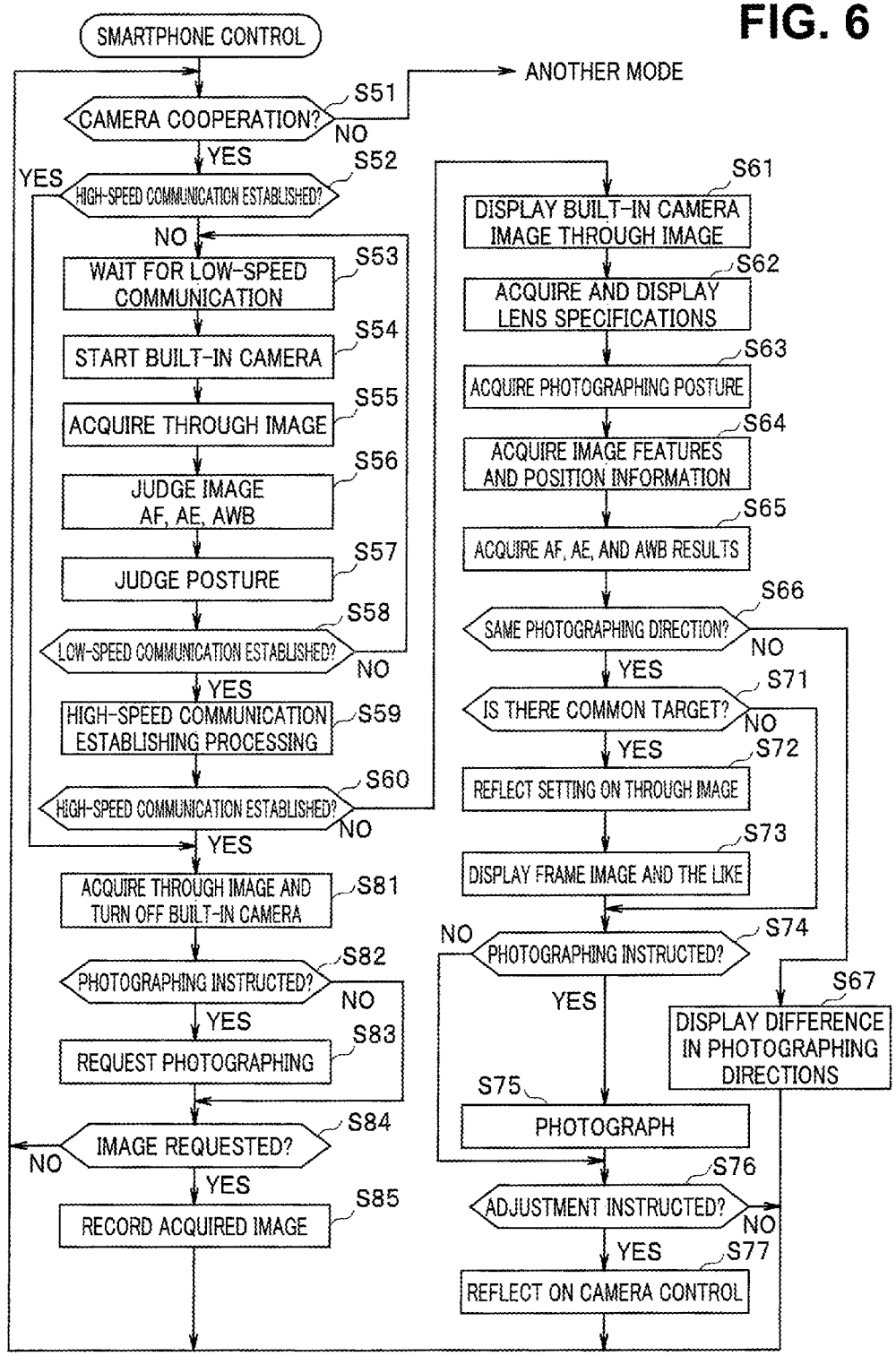
FIG. 6 is a flowchart showing camera control adopted in the second embodiment.

FIGS. 5 and 6 are flowcharts showing camera control adopted in a second embodiment of the present invention. FIG. 5 shows camera control (external camera control) of the lens-type camera 10, and FIG. 6 shows camera control (smartphone control) of the smartphone 20. A hardware configuration in the present embodiment is the same as in the first embodiment.

In the first embodiment, the example of performing the cooperative display is described, in which the built-in camera image is displayed before the establishment of the high-speed communication, and the external picked-up image is displayed after the establishment of the high-speed communication. In an example described in the present embodiment, not only the cooperative display is performed before the establishment of the high-speed communication, but also cooperative photographing control is performed by the built-in camera section 23 and the image pickup section 11.

The control section 25 of the smartphone 20 judges whether a camera cooperative mode is designated in step S51 of FIG. 6. If the camera cooperative mode is designated, the control section 25 performs control for establishing communication with the lens-type camera 10 and judges whether high-speed communication is established in step S52. The control section 25 enters a standby state of low-speed communication when the high-speed communication is not established as in a case in which the time period from a high-speed communication request is relatively short.

Before the low-speed communication is started, the control section 25 acquires various control and information related to the photographing by the built-in camera section 23. For example, the control section 25 starts the built-in camera section 23 in step S54 and acquires the through image of the built-in camera image in step S55. The control section 25 judges the image to obtain each setting value of auto focus, automatic exposure, and automatic white balance of a target region in step S56 and obtains a judgment result of the posture in step S57. In this case, a built-in microphone may be activated first to start acquiring or judging the sound. The control section 25 judges the photographing posture based on the output of the azimuth and angle-of-view judgment section 30. Based on the judgment result and a judgment result of the posture of the lens-type camera 10 described later, the control section 25 can judge whether the photographing direction of the built-in camera section 23 of the smartphone 20 and the photographing direction of the image pickup section 11 coincide, that is, whether a same object can be photographed. In this case, to prevent the user from being confused, the display may be controlled such that the user can recognize that the displayed image is the image of the built-in camera. This may be written and displayed, and various methods are possible, such as changing the frame, showing the image in black and white, and providing this by sound. In this way, a state that the device is doing the best is displayed to prevent the user from being frustrated, and furthermore, observation of an object and recording of an image can be started before the communication is established. Although the image is described here, a similar device is also important for sound, such as in an application for recording the voice of a bird anyhow before the bird escapes when the voice of the bird is to be recorded by a separate microphone or recorder. There is also a need for recording at least the voice before the establishment of the communication, although the user also wants to take an image of the bird. In this way, an information acquisition apparatus including: a first information acquisition section that obtains first information; a first communication section that receives second information obtained by a second information acquisition section according to a first communication standard; a second communication section that performs communication according to a second communication standard different from the first communication standard; and a display control section that notifies a user of the first information during the communication of the second communication section when communication of the first communication section is not established can attain the effects described here if the information acquisition apparatus is applied to an image, sound, or other information.

Note that the display control section can display the first information as a sub image even after the communication of the first communication section is established, and conversely, the display control section may end the display of the first information, just before the establishment of the communication of the first communication section to avoid confusion.

When the low-speed communication is established between the low-speed communication sections 22 and 14, the control section 25 starts establishing processing of the high-speed communication in step S59. Note that the control section 25 may simultaneously start control for establishing communications of both of the low-speed communication and the high-speed communication at the start of the camera cooperative mode. The control section 25 judges whether the high-speed communication is established in step S60. If the high-speed communication is not established, the control section 25 displays the through image based on the built-in camera image in step S61. Note that in some smartphones 20, the built-in camera section 23 includes: an out-camera section that photographs the front; and an in-camera section that picks up an image of the back, and a built-in camera image from the camera section that is turned on is used as a through image. Posture information, azimuth information, and the like of external cameras may be acquired, and an appropriate one of the cameras (the one close to the same direction) may be selected.

Although smartphone cameras are mounted on a plurality of surfaces in some cases, the one on a back side of a display surface or the one viewing the same direction as a barrel-type camera starts photographing. The user may be able to set the direction of the barrel-type camera. Information of posture sensors of the smartphone and the barrel-type camera may be compared, and a dedicated sensor may detect a mounting state. Obviously, image pickup results may be compared, and the comparison results may be reflected at the start of next photographing. These mechanisms and functions may be called a direction judgment section. In this way, the direction judgment section enables to control the display by figuring out a difference between optical axis centers of the built-in camera of the smartphone and the barrel-type camera and the like. Furthermore, a touch section or a dedicated sensor of the smartphone can be used to judge a holding manner of the smartphone. A dedicated sensor, such as touch judgment and a switch, can be provided on the barrel-type camera to similarly judge a holding manner of the camera. A situation of supporting the smartphone by the right hand and supporting the barrel-type camera by the left hand can be judged, and "photographing direction judgment" for judging whether the smartphone and the barrel-type camera face the same direction can also be judged.

On the other hand, the control section 12 of the lens-type camera 10 enters the standby state of the establishment of the low-speed communication in step S21 of FIG. 5. For example, the low-speed communication section 14 can be formed by NFC (Near Field Communication), BLE (Bluetooth (registered trademark) Low Energy), or the like to sufficiently reduce power consumption in the low-speed communication section 14. If a power source of main parts of the lens-type camera 10 is turned off, a battery with a relatively small capacity allows the standby state in which the low-speed communication section 14 is always turned on. When the low-speed communication in the low-speed communication sections 14 and 22 is established, the control section 12 judges whether an instruction for turning on the power source of the lens-type camera 10 is transmitted from the control section 25 of the smartphone 20 (step S22).

If the instruction for turning on the power source is generated, the control section 12 applies power to each section of the lens-type camera 10 and judges whether a photographing mode is instructed (step S23). If the photographing mode is instructed, the control section 12 causes the high-speed communication section 13 to start establishing processing of the high-speed communication (step S24).

The control section 12 acquires photographing information and a through image in steps S25 to S29. That is, the photographing information acquisition section 12c judges a lens specification in step S25. In step S26, the control section 12 judges the photographing posture based on the output of the angle-of-elevation and azimuth sensor 15. The lens-type camera 10 is used separately from the smartphone 20 in some cases, and the lens-type camera 10 may not be able to always photograph the same photographing range as the built-in camera section 23 of the smartphone 20. The control section 12 can judge the photographing posture based on the output of the angle-of-elevation and azimuth sensor 15 and judge whether the photographing direction of the built-in camera section 23 of the smartphone 20 and the photographing direction of the image pickup section 11 coincide, that is, whether the same object can be photographed, based on the judgment result and the judgment result of the posture of the smartphone 20.

The image pickup section 11 outputs the picked-up image to the control section 12. The control section 12 acquires the through image based on the picked-up image of the image pickup section 11 (step S27). The control section 12 obtains image features of an object in the acquired picked-up image and acquires information of a position of the object in the picked-up image (step S28). Note that recording of the image may be started at this timing to allow using the image later. Acquisition of sound may be started for a movie or the like. The control section 12 judges the image to obtain each setting value of the auto focus, the automatic exposure, and the automatic white balance for the target region (step S29).

In the present embodiment, the control section 12 judges whether the high-speed communication is established in step S30. If the high-speed communication is not established, the control section 12 utilizes the low-speed communication to transmit the acquired photographing information to the smartphone 20 in steps S41 to S44. That is, the control section 12 transmits the information of the lens specification in step S41 and transmits the information of the posture in step S42. The control section 12 transmits the image features and the position information in step S43 and transmits the information of each setting value of the auto focus, the automatic exposure, and the automatic white balance for the target region in step S44. Transmission of the sound information and the like may be started in advance at this timing.

Note that if a judgment result indicating that the photographing directions of the image pickup section 11 and the built-in camera section 23 are different from each other is obtained, the control section 12 may transmit a judgment result indicating that the photographing directions are different and information of a difference in the photographing directions in place of the transmission of steps S41 to S44.

On the other hand, the control section 25 of the smartphone 20 receives the information of the lens specifications, the information of the photographing posture, and the information of the image features and the position from the lens-type camera 10 as well as the information of each setting value of the auto focus, the automatic exposure, and the automatic white balance for the target region in steps S62 to S65 of FIG. 6.

The control section 25 judges whether the photographing direction of the built-in camera section 23 and the photographing direction of the image pickup section 11 of the lens-type camera 10 coincide based on the photographing posture of the smartphone 20 acquired in step S57 and the photographing posture of the lens-type camera 10 acquired in step S63. If the photographing directions do not coincide, the control section 25 displays the information of the difference between the photographing directions of the smartphone 20 and the lens-type camera 10 on top of the through image based on the built-in camera image in step S67.

If the control section 25 judges that the photographing directions coincide, the control section 25 in step S71 obtains image features of the built-in camera image and judges whether there is a target common to the built-in camera image and the external picked-up image based on the information of the obtained image features and the information of the image features acquired in step S64. If the control section 25 judges that there is a common target, the control section 25 reflects various acquired setting values on the through image based on the built-in camera image. For example, the control section 25 sets each setting value of the auto focus, the automatic exposure, and the automatic white balance of the lens-type camera 10 in the built-in camera section 23. Using the photographing setting values acquired in the lens-type camera 10 may be able to improve the quality of the picked-up image in the built-in camera section 23. Whether to acquire the sound may also be judged based on whether there is common sound.

Note that the control section 25 of the smartphone 20 may set the photographing conditions of the lens-type camera 10 based on the photographing conditions set in the built-in camera section 23. In this case, there is a possibility of improving the quality of the picked-up image of the lens-type camera 10.

The control section 25 further displays the information display 45 and the frame image 46 (see FIG. 4B) in step S73. The display allows the user to predict the picked-up image of the lens-type camera 10. The frame image 46 allows the user to recognize the photographing range of the lens-type camera 10 before the picked-up image is forwarded from the lens-type camera 10 to the smartphone 20.

Here, it is assumed that the user instructs photographing. The control section 25 judges whether there is a photographing instruction in step S74, and if photographing operation is performed, the control section 25 performs photographing in step S75. For example, when the photographing operation by the user is photographing operation for the built-in camera section 23, the control section 25 applies predetermined still image processing to the picked-up image from the built-in camera section 23 and provides and records the processed still image in the recording section 24. For example, the control section 25 may trim the built-in camera image according to the external picked-up image range. Although the image acquisition is emphasized in the description here, a similar concept can be used to acquire sound. In a case such as when an external camera includes a high-performance microphone, at least the sound recorded by the high-performance microphone can be recorded in advance in step S75. In this way, at least the voice can be recorded even if photographing of the image of the bird is failed, or the obtained voice can be used together later in the replay of the photographed image.

When the photographing operation by the user is photographing operation for the lens-type camera 10, the control section 25 instructs photographing by the lens-type camera 10 through the low-speed communication section 22. When the control section 12 of the lens-type camera 10 receives the information of the photographing instruction through the low-speed communication section 14, the control section 12 controls the image pickup section 11 to pick up an image. In this case, the control section 12 may record the picked-up image in the recording section 18 or may forward the picked-up image to the smartphone 20 after the high-speed communication is established.

In this way, the photographing conditions of the built-in camera section 23 are set according to the photographing information of the lens-type camera 10, and the quality of the picked-up image of the built-in camera section 23 can be improved. The photographing range of the picked-up image of the lens-type camera 10 is displayed in the built-in camera image, and a composition of the picked-up image obtained by the image pickup section 11 of the lens-type camera 10 can be recognized by the built-in camera image. Therefore, the user can obtain a picked-up image satisfactory on some level by photographing by the built-in camera section 23 or the lens-type camera 10 in the present embodiment, before the picked-up image from the lens-type camera 10 is forwarded to the smartphone 20.

The control section 25 further judges whether there is an instruction for adjustment in the photographing in step S76. The user adjusts the photographing conditions and the like while viewing the photographing result. The control section 25 reflects the adjustment result on the camera control (step S77). For example, when operation of enlargement or the like is performed by the smartphone 20, zooming can be set in the image pickup section 11 of the lens-type camera 10 according to the operation.

If the control section 12 of the lens-type camera 10 judges that the high-speed communication is established in step S30, the control section 12 transmits the through image to the smartphone 20 through the high-speed communication sections 13 and 21 in step S31. Note that the image acquired in step S27 may be transmitted here to allow retrospectively viewing the image of delayed communication. When the control section 25 of the smartphone 20 receives the through image from the lens-type camera 10 in step S81, the control section 25 provides the through image to the display control section 28. The display control section 28 provides the picked-up image (external picked-up image) from the lens-type camera 10 to the display section 29 to display the picked-up image in place of the built-in camera image. Note that images may be retrospectively replayed to allow selecting and photographing an image. The images may be retrospectively replayed at a high speed as if through images are continuously displayed, or multiple screens may be set to repeatedly display the images on sub screens. The built-in camera section 23 may be turned off to save power or may be kept turned on to allow recording the built-in camera image as a separate image.

The control section 25 of the smartphone 20 judges whether a photographing instruction is generated in step S82. When the user performs photographing operation, the control section 25 issues a request for photographing to the lens-type camera 10 through the low-speed communication sections 22 and 14 in step S83. The control section 12 of the lens-type camera 10 judges whether there is a photographing instruction in step S32, and when the photographing request from the control section 25 of the smartphone 20 is generated, the control section 12 instructs the image pickup section 11 to perform photographing. The control section 12 forwards the picked-up image from the image pickup section 11 to the smartphone 20 through the high-speed communication sections 13 and 21 (step S33).

The control section 25 judges whether the photographing request for the lens-type camera 10 indicates a mode for requesting forwarding of the picked-up image of the lens-type camera 10 in step S83. If the mode is for requesting the picked-up image, the control section 25 receives the picked-up image forwarded from the lens-type camera 10 through the high-speed communication sections 13 and 21 in step 85. The control section 25 applies predetermined image processing to the picked-up image and provides and records the picked-up image in the recording section 24.

The photographing operation can also be performed in the lens-type camera 10, and the control section 12 judges whether the photographing operation is performed in step S34. When the operation section 16 of the lens-type camera 10 performs the photographing operation, the control section 12 controls the image pickup section 11 to perform photographing. The control section 12 provides and records the picked-up image obtained by the photographing in the recording section 18 (step S36). If the mode for forwarding the picked-up image to the smartphone 20 is set in the lens-type camera 10, the control section 12 moves the processing from step S37 to step S38 and forwards the picked-up image to the smartphone 20 through the high-speed communication sections 13 and 21 (step S38).

Note that the lens-type camera 10 can also perform the photographing before the establishment of the high-speed communication. The control section 12 judges whether the photographing operation is performed in step S45. When the operation section 16 of the lens-type camera 10 performs the photographing operation, the control section 12 controls the image pickup section 11 to perform photographing (step S46). The control section 12 provides and records the picked-up image obtained by the photographing in the recording section 18 (step S47).

In this way, the effects similar to the first embodiment can also be obtained in the present embodiment. Furthermore, the low-speed communication is utilized to forward the photographing information and the like of the lens-type camera to the smartphone before the high-speed communication for forwarding the picked-up image from the lens-type camera to the smartphone is established in the present embodiment. The smartphone can utilize the photographing information of the lens-type camera to control photographing of the built-in camera, and the built-in camera can obtain a high-quality picked-up image.

Note that although the example of using the photographing information of one of the two image pickup sections to set the photographing conditions of the other is described in each of the embodiments, the photographing information of one of the two image pickup sections may be used to control the image processing of the picked-up image from the other image pickup section.

Although the high-speed photographing is mainly described in the embodiments, an application of turning off the Wi-Fi communication when not necessary and replacing the Wi-Fi communication by Bluetooth (registered trademark) is also effective in reducing the power consumption. For example, during the mode setting, the image quality can be adjusted while viewing the screen of the smartphone to reduce the power consumption of Wi-Fi to use the device for a long time period.

The image may not be an image of the lens-type camera if only the image quality or an image of a picture needs to be figured out.

Note that in a device in which the power is maintained only for a short time period with full-time connection, Bluetooth (registered trademark) may not be used if Wi-Fi is intermittently used to perform communication start setting earlier. Near-field wireless communication (such as NFC and TransferJet) that allows instantaneous connection without pairing and without worrying about the power consumption may replace the second communication. Communication not involving an image may be prioritized in this case, too. Although communication of data other than the image is described, a small-capacity image can be included.

Although the digital camera is used as a device for photographing in the description of each of the embodiments, the camera may be a digital single-lens reflex camera or a compact digital camera. The camera may be a camera for movie, such as a video camera and a movie camera, and the camera can obviously be built in a portable information terminal (PDA: Personal Digital Assist), such as a portable phone and a smartphone.

The system of sending data with a large capacity, such as an image, and data with a relatively small capacity associated with the data can be used not only in a consumer sector, but also in industrial and medical fields. For example, an image device in which an image pickup section and a display section or an operation section are separated can be applied. For example, at inspection of inside of a body, a machine, or the like, the image pickup section is put inside, and an operation section side first photographs a surface of the body, the machine, or the like to reduce an unnecessary time period. The system can also be used in an application in which positioning is performed by first outputting only information of a position through communication of a second communication standard prior to forwarding of an observed image from an internal image pickup section through communication of a first communication standard. In this way, other observation can be performed first, and following observation and diagnosis can be started early without a waiting time period of communication of the first communication standard.

Although the example in a photographing scene that requires a relatively high-speed response is described here, each of the embodiments includes a technical scope exceeding a limited range of photographing, as long as substitute means is offered by adopting other means to alleviate the frustration of the user when communication cannot be performed. The embodiments can be applied not only to an image, but also to sound recorded by an IC recorder or the like. As with the image, the communication may take a long time period when the sound is multi-channel, high-resolution audio. In addition, it goes without saying that the invention can be utilized not only at the start of communication, but also to avoid a trouble at the shutoff of communication, as long as measurable information is cooperatively obtained by devices.

The present invention is not limited to each of the embodiments, and constituent elements can be modified in an execution phase without departing from the scope of the present invention to embody the present invention. In addition, various inventions can be formed by appropriate combinations of a plurality of constituent elements disclosed in each of the embodiments. For example, some of the entire constituent elements illustrated in the embodiments may be deleted. Furthermore, constituent elements across different embodiments may be appropriately combined.

Note that even if "First," "Next," and the like are used for convenience in the description regarding the claims, the specification, and the action flows in the drawings, this does not mean that the execution in this order is essential. Furthermore, it goes without saying that each step included in the action flows can be appropriately eliminated, for a part not affecting the principle of the invention.

Note that the control mainly described in the flow charts in the technique described here can be set by a program in many cases, and the program is stored in a recording medium or a recording section in some cases. The program may be recorded in the recording medium or the recording section at product shipment. A distributed recording medium may be utilized, or the program may be downloaded through the Internet.

What is claimed is:

1. An information terminal apparatus comprising:
   a first image pickup section that obtains a first picked-up image;
   a first communication section that receives a second picked-up image obtained by a second image pickup section of a second device, external to the information terminal apparatus, according to a first communication standard;
   a second communication section that performs communication with the second device according to a second communication standard that is different from the first communication standard;
   a display section; and
   a control section that causes the display section to display the first picked-up image responsive to a determination that communication with the second device via the first communication section is not yet established.

2. The information terminal apparatus according to claim 1, wherein the control section further causes the display section to display a representation of photographing information related to the second image pickup section together with the first picked-up image once the photographing information is transmitted by the second device and received via the second communication section before the communication with the second device via the first communication section is established.

3. The information terminal apparatus according to claim 2, further comprising:
   angle of elevation and azimuth sensors, wherein the control section further judges (1) a photographing direction of the first image pickup section based on output of the angle of elevation and azimuth sensors, and (2) a photographing direction of the second image pickup section based on output of angle of elevation and azimuth sensors of the second device, wherein
   the control section places the representation of the photographing information together with the first picked-up image using the judgment result.

4. The information terminal apparatus according to claim 1, wherein
   the control section sets the first image pickup section based on the photographing information or the output of the angle of elevation and azimuth sensors of the second device.

5. The information terminal apparatus according to claim 2, wherein the control section sets the first image pickup section based on the photographing information or the output of the angle of elevation and azimuth sensors of the second device.

6. The information terminal apparatus according to claim 1, wherein
the control section sets a photographing condition related to the first image pickup section in the first image pickup section through the second communication section.

7. The information terminal apparatus according to claim 2, wherein
the control section sets the photographing condition related to the first image pickup section in the first image pickup section through the second communication section.

8. The information terminal apparatus according to claim 1, wherein
the control section controls the display to display the second picked-up image once the communication with the second device via the first communication section is established.

9. The information terminal apparatus according to claim 1,
wherein the control section displays an image indicating an image pickup range of the second picked-up image in the first picked-up image or an image based on sound as the display based on the photographing information.

10. An information terminal apparatus comprising:
a first communication section that performs communication according to a first communication standard with a device including a first image pickup section that obtains a first picked-up image;
a second communication section that performs communication according to a second communication standard different from the first communication standard with the device;
a second image pickup section that obtains a second picked-up image; and
a control section that transmits the second picked-up image obtained by the second image pickup section to the device through the first communication section and transmits second photographing information related to the second image pickup section to the device through the second communication section responsive to a determination that the communication with the device via the first communication section is not yet established.

11. An information support method comprising:
a step of executing processing for establishing communication between an information terminal and a second device external to the information terminal according to a first communication standard used for image transfer;
a step of executing processing for establishing communication between the information terminal and the second device according to a second communication standard that is different from the first communication standard;
a step of acquiring a first picked-up image by a first image pickup section of the information terminal;
a step of displaying the first picked-up image;
a step of acquiring photographing information related to photographing of a second image pickup section of the second device via the communication based on the second communication standard once the communication according to the second communication standard is established responsive to a determination that the communication according to the first communication standard is not yet established;
a step of displaying a representation of the photographing information on top of the first picked-up image; and
a step of displaying a second picked-up image obtained by the second image pickup section responsive to a determination that the communication according to the first communication standard is established.

12. The information support method according to claim 11, further comprising:
a step of setting the first image pickup section based on the photographing information before the establishment of the communication according to the first communication standard.

13. A non-transitory computer-readable recording medium recording an information support program for causing a computer to execute:
a step of executing processing for establishing communication between an information terminal and a second device external to the information terminal according to a first communication standard used for image transfer;
a step of executing processing for establishing communication between the information terminal the second device according to a second communication standard that is different from the first communication standard;
a step of acquiring a first picked-up image by a first image pickup section of the information terminal;
a step of displaying the first picked-up image;
a step of acquiring photographing information related to photographing of a second image pickup section of the second device via the communication based on the second communication standard once the communication according to the second communication standard is established responsive to a determination that the communication according to the first communication standard is not yet established;
a step of displaying a representation of the photographing information on top of the first picked-up image; and
a step of displaying a second picked-up image obtained by the second image pickup section responsive to a determination that the communication according to the first communication standard is established.

14. The non-transitory computer-readable recording medium recording the information support program according to claim 13, the information support program further comprising:
a step of setting the first image pickup section based on the photographing information before the establishment of the communication according to the first communication standard.

15. An information acquisition apparatus comprising:
a first information acquisition section that obtains first information;
a first communication section that receives second information obtained by a second information acquisition section according to a first communication standard;
a second communication section that performs communication according to a second communication standard different from the first communication standard; and
a display section that notifies a user of the first information during the communication of the second communication section responsive to a determination that communication of the first communication section is not yet established.

16. The information acquisition apparatus according to claim 15, further comprising:

a database that associates the second information and the first information.

17. The information terminal apparatus according to claim 1, wherein the first communication standard has a higher data rate than the second communication standard, and the first communication standard takes longer to establish data communications than the second communication standard.

18. The information terminal apparatus according to claim 10, wherein the first communication standard has a higher data rate than the second communication standard, and the first communication standard takes longer to establish data communications than the second communication standard.

19. The information support method of claim 11, wherein the first communication standard has a higher data rate than the second communication standard, and the first communication standard takes longer to establish data communications than the second communication standard.

20. The computer-readable recording medium of claim 13, wherein the first communication standard has a higher data rate than the second communication standard, and the first communication standard takes longer to establish data communications than the second communication standard.

21. The information acquisition apparatus of claim 15, wherein the first communication standard has a higher data rate than the second communication standard, and the first communication standard takes longer to establish data communications than the second communication standard.

* * * * *